March 10, 1959     A. C. VELDHUIS     2,877,331
ICING-CONDITION INDICATOR
Filed June 27, 1955
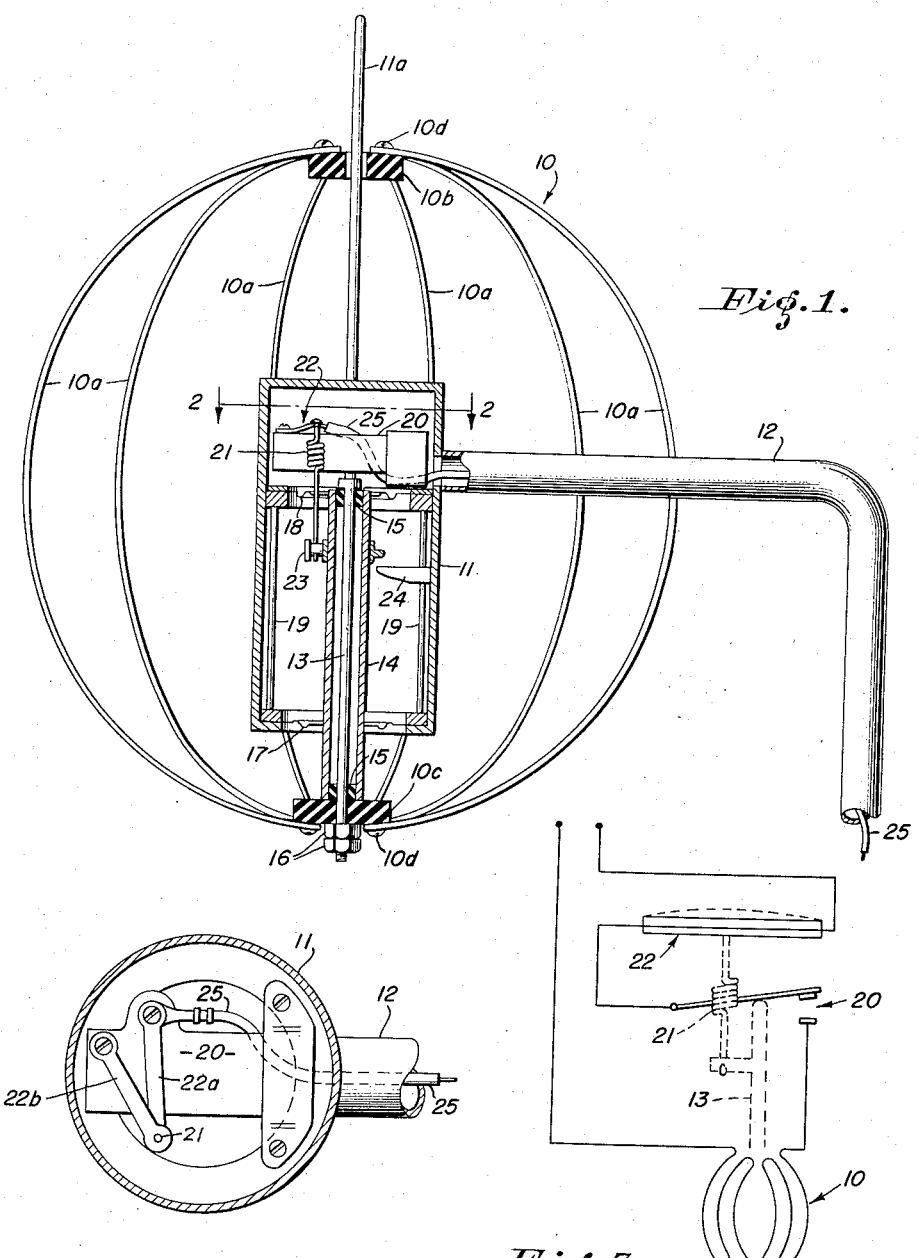
INVENTOR
ALBERT C. VELDHUIS
BY *Ralph B. Stewart*
ATTORNEY

United States Patent Office 2,877,331
Patented Mar. 10, 1959

2,877,331

ICING-CONDITION INDICATOR

Albert C. Veldhuis, West Chester, Pa., assignor to Wind Turbine Company, West Chester, Pa., a corporation of Pennsylvania Application June 27, 1955, Serial No. 518,295

7 Claims. (Cl. 219—19)

This invention relates to an improved icing-condition indicating device which has a high degree of sensitivity and a positive response to icing conditions regardless of wind conditions.

An object of the invention is to devise an ice indicator which provides a reliable indication of icing conditions and which is unaffected by the velocity or direction of the wind accompanying the icing conditions.

Another object of the invention is to provide an indicator which will respond positively to the presence of a relatively small amount of ice.

The improved indicator utilizes an ice collector in the form of a spherical wire basket or cage to actuate a switch which controls a circuit for de-icing the ice collector, and a biasing means, such as a thermally responsive element, which is also controlled by the switch to restore the ice collector to its normal position after the de-icing current has melted the collected ice.

In designing an ice collector for an icing-condition indicator, it is desirable to provide as large a collecting surface as possible in order to increase the amount of ice collected and thereby increase the sensitivity of the indication. However, if a large continuous surface is provided, it will be relatively ineffective in many applications where icing conditions are accompanied by relatively strong winds. This is because a relatively large surface in a strong wind would be subjected to a high wind loading unless it is more or less streamlined in shape. Where icing is caused by freezing of droplets of under-cooled water and the adherence of the ice particles thus formed, it has been found that a small object or sharp edge will collect more ice than large, well rounded or streamlined objects. This is caused by the fact that a large streamlined object will deflect the air stream gradually and the water droplets will be carried around the object. A small, sharp obstruction, however, causes the air stream to be deflected abruptly and the momentum of the water droplet will prevent its being carried around the object causing the abrupt deflection. Consequently, the droplet will strike the obstruction and freeze, causing a build-up of ice.

Another consideration in designing an ice collector is that it should present a uniform profile to the wind, regardless of the direction of the wind. One method of accomplishing this result is to mount the collector on a swivel base and keep it constantly heading into the wind.

The improved ice collector is in the form of a substantially spherical basket or cage formed of a large number of small diameter wires. Thus the collector presents a uniform profile to the wind, regardless of the wind direction, and provides a large number of relatively sharp obstructions to the air flow for maximum ice collection. At the same time, the complications in design required to keep an asymmetrical ice collector headed into the wind are eliminated.

The principal factor affecting the sensitivity of an ice indicator is the amount of force required to actuate the indicating mechanism. As previously pointed out, one way of increasing sensitivity is to increase the ice-collecting area. However, since there are limitations imposed on the size of the ice-collecting surface by various practical design considerations, the actuating mechanism itself must be designed to require a minimum actuating force.

In a detection system utilizing the weight of the collected ice to close an electrical indicating circuit, it is desirable to incorporate a snap-action actuating mechanism to eliminate chattering of the switch contacts. It is also desirable to have a differential snap-action, that is, to require more force to open the contacts than to close them. The greater the differential, the more positive the switch action; however, if the differential is greater than the weight of collected ice, the switch contacts will not open upon melting of the ice. Thus, the sensitivity is limited by the amount of differential action required for positive response.

The term "snap-action" as used herein refers to switch structures or switch actuating arrangements in which the force required for initiating the actuation of the switch is greater than that required for maintaining the switch in actuated position. This includes switches and switch operating mechanisms which may return to the unactuated position under a smaller force than the initial actuating force but acting in the same direction, or to switches requiring the application of a force in the reverse direction for return to the unactuated position. The snap-action may be incorporated in the switch unit per se, or it may be embodied in any part of the arrangement by which the switch is actuated from the ice collector.

By applying an additional restoring force to the switch actuating mechanism at the time of melting the collected ice, and removing this additional force during the balance of the operating cycle, I have devised an actuating mechanism which is extremely sensitive and yet provides a positive response heretofore possible only at the expense of sensitivity. The combination of this improved actuating mechanism with the improved ice collector results in an ice indicator having superior operational characteristics of sensitivity, positive response, and reliability.

A preferred embodiment of my invention is illustrated in the accompanying drawing in which:

Figure 1 is a side view in elevation, partly broken away to show the actuating mechanism within the housing;

Figure 2 is a view, on a slightly enlarged scale, along the line 2—2 of Figure 1; and Figure 3 is a schematic diagram showing the wiring connections and operative relation of the various elements.

Referring to the drawing, an ice collector 10 in the form of a spherical basket or cage is shown surrounding a housing 11 which is supported by conduit 12. The housing 11 encloses the mechanism which supports ice collector 10 and which is actuated by the accumulation of ice on collector 10. In addition to supporting housing 11, conduit 12 carries the wires required to make the necessary electrical connections to the mechanism within housing 11.

The ice collector 10 is formed of a plurality of wire elements 10a, each being bent into a generally semi-circular shape, and the elements are arranged to form a spherical basket or cage. The ends of the individual wire elements are supported on two disc-shaped insulators 10b and 10c by any suitable means such as screws 10d. The wire elements are connected together electrically to form at least one continuous circuit in order that the collector may be heated by passing an electric current therethrough to melt accumulated ice. It will be apparent that the ice collector may be formed from one or more continuous lengths of wire, each wire being run in a zig-zag fashion from one insulator disc to the other, and passing around screws 10d, thereby forming several of the semi-circular wire elements 10a. A vertical guide rod 11a is mounted on the top of housing 11 and extends through an aperture formed in the upper insulator disc 10d to prevent the use of the ice collector 10 as a perch by birds.

The ice collector 10 is supported by actuator rod 13 which is mounted within sleeve 14 and insulated therefrom by insulator rings 15. Insulator disc 10c is clamped against the lower end of sleeve 14 by nuts 16 which are threaded on the lower end of actuator rod 13. Sleeve 14 is supported within the housing by two corrugated diaphragms 17 and 18, each being clamped at its periphery between a pair of clamping rings. These diaphragms support the weight of the moving parts of the actuating mechanism. The lower diaphragm 17 also acts as a sealing member to prevent the entry of foreign matter or moisture into housing 11. The upper diaphragm 18 is held in fixed relation to the lower diaphragm 17 by spacer rods 19 connected between the clamping rings of the two diaphragms.

Mounted above diaphragm 18 in a position to be actuated by actuator rod 13, is a switch 20. In the embodiment illustrated in the drawing, the snap-action is provided by the switch mechanism, the switch being of the known "microswitch" construction. The switch 20 is of the normally closed type, that is, the contacts are biased to the closed position, but the normal position of the switch in this application is the actuated position. In other words, the switch actuating button is normally depressed by actuator rod 13 and the contacts of the switch 20 held in the open position.

The biasing force required to hold the contacts of switch 20 in the open position is supplied by actuator spring 21 and bi-metallic member 22. Bi-metallic member 22 is formed of two bi-metallic arms 22a and 22b which are joined at one end and which have the other end of each arm fastened to the housing of switch 20. The upper end of actuating spring 21 is attached to the joined ends of arms 22a and 22b. The spring passes through an aperture in diaphragm 18 and the lower end is hooked around bracket 23 which is mounted on sleeve 14. The position of bracket 23 on sleeve 14 is adjustable in order to vary the biasing force applied to the sleeve. A stop member 24 is adjustably mounted on one of the spacer rods 19 in a position to engage bracket 23 and limit the travel of sleeve 14 in a downward direction and thereby relieve diaphragms 17 and 18 from excess strain.

Electric current for de-icing the collector is supplied through conductor 25 in conduit 12 and flows through arms 22a and 22b of bi-metallic member 22, through the switch contacts when they are in the closed position, through the wires 10a, and back to the source of current. The various connections have not been illustrated in Figure 1 for the sake of clarity, but actuator rod 13 is utilized to conduct current from the switch to the wires 10a, and the sleeve 14 is utilized for the return conductor. The wiring connections are shown schematically in Figure 3.

As previously stated, actuator rod 13 normally holds the contacts of switch 20 in the open position. When ice begins to accumulate on ice collector 10, the added weight eventually overcomes the biasing force applied to actuator rod 13 and the contacts of switch 20 snap to the closed position. This completes the circuit to the wires 10a of ice collector 10 through bi-metallic member 22. The passage of current through arms 22a and 22b causes them to heat up and deform in an upward direction, thus increasing the biasing force applied to actuator rod 13. At the same time, the wires 10a of the ice collector are being heated by the current and, after a time, the ice accumulated thereon is melted. The combination of the reduced weight of ice and the increased biasing force causes the actuator rod 13 to return to the normal position and open the switch contacts. If no more ice accumulates on the ice collector 10, the biasing force applied to actuator rod 13 after the bi-metallic element 22 has cooled is sufficient to hold the switch contacts in the open position. However, if ice again accumulates on the ice collector 10, the above cycle of operation will be repeated until the weather conditions have changed so that icing conditions no longer prevail.

While I have described and illustrated a specific embodiment of my invention, it will be apparent to those skilled in the art that various modifications are possible without departing from the spirit and scope of the invention.

I claim
1. An icing-condition indicator comprising an ice collector member, switch means operable to the closed position by said collector member upon the accumulation of ice thereon, biasing means operable to apply a continuously operating biasing force tending to return said switch means to the open position, and electric means energized by the closing of said switch means to increase said biasing force.

2. An icing-condition indicator comprising an ice collector member, switch means operable to the closed position by said collector member upon the accumulation of ice thereon, continuously operating biasing means including a thermally responsive member and operable to return said switch means to the open position, and an electric circuit energized by the closing of said switch means to heat said thermally responsive member and thereby to increase the biasing force applied to said switch means.

3. An icing-condition indicator comprising an ice collector member, electric means for heating said ice collector member, a snap-acting switch in the supply circuit to said electric means, means connecting said ice collector member and said switch so that the weight of ice collected on said ice collector member tends to close the contacts of said switch, a thermally responsive member of the electrically-heated type connected in the supply circuit of said heating means, and biasing means connecting said thermally responsive member to said switch to return the contacts of said switch to the open position, said thermally responsive member being operative, when heated, to increase the force exerted by said biasing means tending to open said switch.

4. An icing-condition indicator comprising an ice collector member, switch means operable by said collector member so that the weight of ice collected on said collector member tends to close the contacts thereof, continuously operating biasing means tending to hold said contacts in the open position, and thermally responsive means connected in a circuit controlled by said switch means and being operable to augment the force applied to said contacts by said biasing means upon being heated by the passage of an electric current therethrough.

5. An icing-condition indicator comprising an ice collector member formed of a plurality of wires arranged to form a spherical cage, means connecting said wires to form at least one continuous circuit therethrough, switch means electrically connected in series with said wires and mechanically connected to said ice collector member so that the weight of ice collected on said collector member tends to close the contacts of said switch means, biasing means holding said contacts in the open position, and a thermally responsive member electrically connected in series with said switch means and mechanically connected to augment the biasing force applied by said biasing means.

6. In an ice indicator, an ice collector member comprising a plurality of wire members, each being formed in a generally semi-circular shape, two spaced insulating members, the corresponding ends of each wire member being connected to one of said insulating members and the opposite end of each wire member being connected to the other of said insulating members, said semi-circular members being disposed to form a spherical cage, and means connecting said wire members to form at least one continuous electric circuit therethrough, whereby said ice collector member may be heated by the passage of an electric current through said wires.

7. In an ice indicator, an ice collector member comprising a plurality of wire members of relatively small diameter, two spaced insulated mounting members, said wire members being symmetrically disposed about an axis passing through said insulated mounted members and having the corresponding ends thereof connected to one of said insulated mounting members and the opposite ends thereof connected to the other of said insulated mounting members, the middle portions of said wire members being bowed outwardly with respect to said axis and being exposed to ambient atmosphere so that ice may form directly on said members from said atmosphere, and means connecting said wire members to form at least one continuous electric circuit therethrough, whereby said ice collector member may be heated by the passage of an electric current through said wire members.

References Cited in the file of this patent

UNITED STATES PATENTS

| | | |
|---|---|---|
| 1,934,375 | Reynolds et al. | Nov. 7, 1933 |
| 2,269,019 | Hall | Jan. 6, 1942 |
| 2,520,788 | Wales | Aug. 29, 1950 |
| 2,541,512 | Hahn | Feb. 13, 1951 |
| 2,566,813 | Thorsen | Sept. 4, 1951 |
| 2,662,156 | Potter | Dec. 8, 1953 |
| 2,792,895 | Carpenter | May 21, 1957 |